April 11, 1944.  C. A. BREWER  2,346,533
CONTROL SYSTEM FOR MOTOR VEHICLES
Original Filed Oct. 2, 1929

INVENTOR.
CHARLES A. BREWER
BY F. Bascom Smith
ATTORNEY

Patented Apr. 11, 1944

2,346,533

UNITED STATES PATENT OFFICE 2,346,533

CONTROL SYSTEM FOR MOTOR VEHICLES

Charles A. Brewer, Noroton Heights, Conn., assignor of one-half to Philip J. Kury, Arverne, N. Y.

Original application October 2, 1929, Serial No. 396,691. Divided and this application January 17, 1944, Serial No. 518,649

16 Claims. (Cl. 192—.01)

This invention relates to motor vehicles or the like and more particularly to a safety control system for controlling the operation thereof whereby safety in operation and ease of control are materially enhanced.

This application is a division of my copending application, Serial No. 396,691, for "Safety control system for motor vehicles," filed October 2, 1929, and all subject matter contained in said copending application which is applicable to the disclosure of the present application is made a part hereof by reference.

One of the objects of the present invention is to provide an improved operating and control means for the clutch of a motor vehicle or the like.

Another object is to provide novel apparatus for actuating the clutch of a motor vehicle wherein novel fluid pressure actuated valve means are employed for controlling the engaging movement of the clutch.

Another object of the invention is to provide novel means for controlling the power actuation of a clutch mechanism of a motor vehicle whereby safety is promoted, wear and tear on the vehicle and parts thereof are reduced, more uniform operation and control are attained, starting strains are reduced, and fatigue of the operator is materially lessened.

A further object is to provide an improved power control for a clutch whereby substantially no effort is required on the part of the driver in releasing the clutch and controlling the engagement thereof.

Still another object is to provide novel apparatus for actuating and controlling the engagement of a clutch of a motor vehicle or the like whereby a simulation of expert manual operation of the clutch is obtained.

The above and further objects and novel features of this invention will more fully appear from the following detailed description taken in connection with the accompanying drawing. It is to be expressly understood, however, that the drawing is for the purpose of illustration only and is not designed as a definition of the limits of the invention, reference being primarily had for this latter purpose to the appended claims.

In the drawing, wherein like reference characters refer to like parts throughout the several views, Fig. 1 is a diagrammatic side elevation of a portion of the vehicle, partly in section and with parts broken away, illustrating one form of apparatus embodying the present invention;

Figure 1:
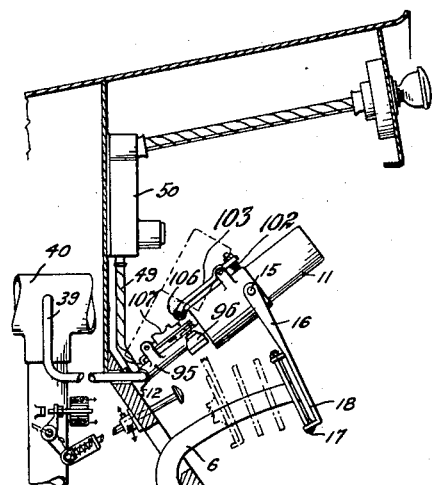
Figure 2:
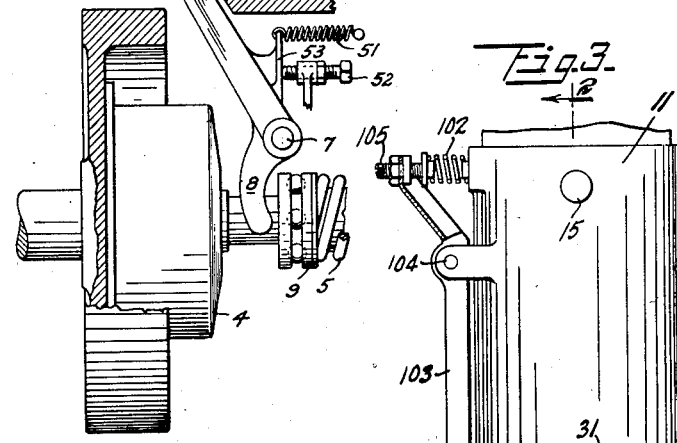
Fig. 2 is an enlarged scale sectional view, with parts broken away, of the clutch operating power device of Fig. 1, the section being taken substantially on line 2—2 of Fig. 3.
Figure 3:
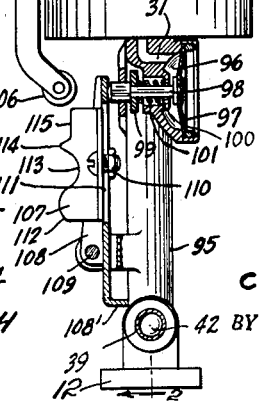
Fig. 3 is a partial side elevation, partly in section, showing said power device and control means therefor, the section being taken substantially on line 3—3 of Fig. 2.

One form of clutch operating mechanism which may be employed in carrying out the present invention is illustrated, by way of example, in Figs. 1 to 3, inclusive, of the drawing wherein the clutch 4 of a motor vehicle, normally held in operative engaged position by a spring 5, is adapted to be moved to disengaged position by the depression of a clutch pedal 6 of the type ordinarily provided for manual actuation of the clutch mechanism. Pedal 6 is pivotally mounted at 7 and is provided with a bifurcated portion 8 which is adapted to engage a bearing 9 for disengaging the clutch mechanism. A power device of the fluid pressure vacuum actuated type is provided for operating the clutch mechanism, said device being preferably attached directly to clutch pedal 6.

The power device comprises two relatively movable elements which, in the present case, are constituted by a piston element 10 and a cylinder 11 enclosing the piston, either of which may be movable. In the particular embodiment shown, the piston represents the stationary element and the cylinder is moved relative thereto in a manner and for a purpose to appear hereafter. A bracket 12 is mounted on the foot board of the vehicle adjacent pedal 6 for supporting the power device. Preferably a stem 95 is connected at its upper end to piston 10 and is pivotally connected at its lower end to bracket 12 by any suitable means such as a pivot pin 14. Cylinder 11 carries trunnions 15 adapted for pivotal connection with a bracket arm 16 which may be clamped by any suitable means, such as bolts 17, to the head or footrest 18 of clutch pedal 6. Therefore, as the cylinder moves, the clutch will be correspondingly shifted, the pivotal connections 14 and 16 permitting the power device to swing to compensate for the arcuate movement of head 18 about the pedal pivot 7.

The power device in the present instance is operated by suction from any suitable source such, for example, as the intake manifold of the vehicle motor and it is shown as being electrically controlled. Piston 19 may carry the usual cup leather 19 to prevent leakage past the piston and it is guided in the cylinder by the annular walls 20. This piston also carries control mechanism for the power device, said control mechanism comprising a solenoid coil 21 mounted in a casing 22 in the piston and having a central opening 23 through which extends an armature 24 having valves 25 and 26 at its opposite ends to control openings 27 and 28, respectively, in opposite ends of casing 22. Opening 27 is in the top wall of casing 22 and communicates with space 29 which in turn is normally in communication with the atmosphere through annular space 30 and passage 31 in piston 10. The space 34 within casing 22 communicates with the space 35 in cylinder 11 above piston 10 through a plurality of passages 36 in the connecting and spacing bolts 37.

The opening 28 and valve 26 control communication from space 34 and passage 23 to a passage 38 extending longitudinally in stem 95 of piston 10, the latter passage being in constant communication with the hollow center portion of pivot pin 14 which is in turn connected through a suitable tubular connection 39 with a source of suction such as the intake manifold 40 (Fig. 1) of the vehicle motor. A joint 41 permits relative turning movement between conduit 39 and pivot pin 14. This joint also serves as a means for carrying a check valve of any suitable type, such as ball 42, normally held against its seat by a spring 43. As shown in Fig. 2, check valve 42, 43 is so arranged as to permit air to flow from passage 38 to the intake manifold but to prevent flow of air in the opposite direction.

A spring 44 embraces the armature 24 and tends to shift the same downwardly to normally close valve 26, 28 and open valve 25, 27. Solenoid 21 is accordingly so constructed with relation to armature 24 that excitation thereof will raise the armature to close valve 25, 27 and open valve 26, 28. This will place passage 38 in communication with space 35 in cylinder 11 above piston 10, thus cutting said space off from communication with atmosphere and connecting the same with intake manifold 40, whereupon the air in space 35 is withdrawn through passages 36, space 23, 34, passage 38 and conduit 39. Cylinder 11 and bracket 16 are thus moved downwardly relative to piston 10 to actuate clutch pedal 6 and thereby disengage the driving surfaces of the clutch mechanism 4.

In order to energize solenoid 21 for the purpose above pointed out, lead wires 45 are led to the solenoid coil through a tube 46 attached to piston 10 and stem 95, said wires being connected at their other ends to a suitable jack 47. The lower end of the latter is contacted by a pair of spring contacts 48 which are in turn connected to a suitable source of electrical energy, such as a battery 62, through a flexible protective cable or conduit 49 and a connection box 50, said box being mounted in any suitable position where it is easily accessible and in which the desired electrical connections may be made to one or more suitable control switches, such as switch 54.

It will of course be apparent that power device 10, 11 is normally in the full line position illustrated, i. e., with cylinder 11 in its upper position, valve 25 being open and space 35 being in communication with atmosphere through space 29, 30 and passage 31. Clutch pedal 6 is thus also normally in raised position and the clutch parts in driving engagement. Upon upward movement of the clutch pedal and hence that of cylinder 11 under action of a suitable spring 51 it is limited by an adjustable stop screw 52 carried by a stationary element of the vehicle frame and adapted to engage a lug 53 on pedal 6.

Novel means are provided in combination with the above described clutch operating power device for automatically controlling the engaging movement of the clutch. In the form shown, said means includes a chamber 96 which is directly connected with passage 31. One side of chamber 96 is closed by a flexible diaphragm 97 which is connected to a rod 98 carrying a valve 99, the latter being adapted to close the entrance to passage 100 which connects chamber 96 with the atmosphere outside the power device when valve 99 is open as shown in Fig. 3. A spring 101 tends to hold this valve in open position.

An adjustable compression spring 102 mounted on the cylinder of the power device reacts on a lever 103 pivoted at 104 and the pressure of said spring may be adjusted by means of the adjusting screw 105. At its opposite end lever 103 carries a roller 106 which is adapted to roll along the outer surface of a cam block 107 mounted on a lever 108 pivoted on a stem 95 at 109 and adapted to engage at its free end against the stem 98 of the valve 99. Cam block 107 is adjustably mounted on lever 108 by means of a nut and screw 110 in a slot 111. The spring 102 cooperating with the cam 107 controls the vacuum resistance in the cylinder during the clutch engaging movement in a manner more fully described hereafter.

Thus, in operation, the clutch is released or disengaged by energizing the solenoid 21 to thereby effect the closing of valve 25 and the opening of valve 26. Chamber 35 is thus cut off from communication with atmosphere through passages 31, 100 and is connected with intake manifold 40 of the motor through passage 38 and conduit 39. Cylinder 11 is then drawn downwardly to its lowest position as indicated by dotted lines in Fig. 1, it being in its uppermost position in Figs. 2 and 3. When the circuit to solenoid 21 is opened to de-energize the same, valve rod 24 is moved downwardly by spring 44 to close valve 26 and open valve 25. In this manner chamber 35 is cut off from communication with the intake manifold and is placed in communication with the atmosphere through the passage 31, chamber 96, and valve passage 100.

Figure 4:
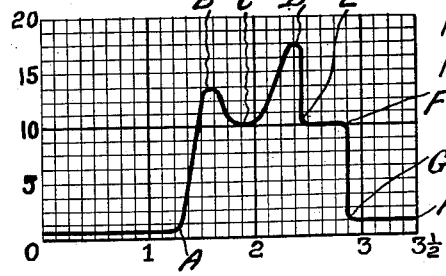
Fig. 4 is a diagram graphically illustrating the operation of said power device.

While the clutch is disengaged and cylinder 11 is in its lowermost position, the roller 106 is below cam 107 and valve 99 is in open position. Thus, when valve 25 is opened by spring 44, chamber 35 is placed in free communication with the atmosphere and springs 5 and 51 force the clutch pedal and cylinder 11 upwardly, thus moving the clutch driving surfaces toward engaged position. The diagram in Fig. 4 shows approximately the action during the clutch engaging movement and the upward movement of the clutch pedal. In this diagram the ordinates represent resistance to upward movement of the clutch pedal in pounds while the abscissae represent inches of movement of the pedal.

Thus, when the circuit is broken through solenoid 21, as just described, the pedal is in its lowest position indicated by the point 0. Since roller 106 is below cam 107, valve 99 is open to permit free communication between the atmosphere and chamber 35 in cylinder 11 so that there will be very little resistance to upward movement of the pedal and, hence, to engaging movement of the clutch driving surfaces. This initial movement is accordingly relatively rapid because of the low resistance indicated on the curve in Fig. 4 from point 0 to point A. Point A is preferably just prior to the beginning of clutch engagement and at this point roller 106 runs onto the cam 107 at point 112. If spring 102, for example, has been adjusted to maintain 15 pounds vacuum resistance in cylinder chamber 35 and, as is the case, the vacuum in the chamber at this point is very small, the roller 106 will press against cam 107 and close valve 99, thereby preventing further entrance of air to said chamber. This will increase resistance to upward movement of the cylinder and clutch pedal, thereby slowing up the clutch engagement, said resistance being indicated on the diagram of Fig. 4 from point A to point B.

The clutch starts engagement soon after the point A, so it will be seen the clutch moves very slowly as it starts engagement, thus permitting the car to start in motion with a very easy movement and without jerking. The car probably starts to move about the time or just before the point B. Beyond this point, as the car has started in motion, it is desirable that the clutch move somewhat more rapidly and, therefore, at this point the roller 106 begins to run off the hump 112 on cam 107 into the hollow 113. This reduces the pressure tending to close valve 99, thereby permitting it to partially open and admit more air to the cylinder. This, of course, decreases the vacuum resistance as indicated by the curve B to C in the diagram and permits more rapid movement of the cylinder and clutch.

The car has now started and while it gains momentum it is desirable that the clutch move somewhat more slowly and, therefore, the roller 106 runs onto the raised portion 114 of the cam again closing the valve 99. If the vacuum in the cylinder of the power device is not greater than the pressure for which the spring 102 is set, the closing of valve 99 causes increasing of the vacuum in chamber 35 and, hence, an increased resistance to the movement of the clutch pedal as is indicated by the curve from C to D. At the point D the clutch is nearly engaged and the car has gained momentum and, as the roller 106 drops off of point 114, the valve 99 is again permitted to partly open permitting atmospheric air to enter chamber 35 and causing the vacuum resistance to drop as is indicated by the curve D to E. The roller 106 runs on the straight surface 115 for a short time as indicated by the curve E to F, permitting the clutch to become completely engaged at F when the roller 106 runs off the cam entirely. When this occurs, the valve 99 is moved to fully open position, thereby reducing the vacuum in chamber 35 and the consequent resistance to clutch engaging movement of the pedal, as is indicated by the curve F to G. The clutch is now fully engaged and the rest of the movement of the clutch pedal is merely the lost motion movement effected by spring 51 to insure that the clutch remains fully engaged, said movement being made quite rapid against small resistance, as is indicated by the curve G to H.

It will be understood that this operation, as just described, is merely an example and that the clutch engagement movement may be given different control and different timing by merely changing the shape of the cam 107 or adjusting its position on the lever 108, or by adjusting the pressure of the spring 102. The outward movement of lever 108 may be limited by a stop 108' on the lever and adapted to engage the stem 95. The pressure of the spring 102 and the differential pressure acting on diaphragm 97 in this device automatically compensate for leaks in the system or other abnormal conditions to maintain the automatic control and operation desired for the clutch engagement. Thus, for example, as the vacuum in the cylinder is equal to the spring pressure ratio against the diaphragm area, the diaphragm and valve 99 regulate the vacuum in the cylinder, but they are controlled by the spring 102 and the cam 107, the amount of the vacuum being controlled by the spring 102 while the cam 107 controls the effective pressure of spring 102. Thus, for example, if spring 102 is set for fifteen pounds, when roller 106 rolls onto the high parts of the cam, the valve 99 will remain closed until the vacuum reaches fifteen pounds. If the vacuum increases beyond this point, pressure on diaphragm 97 will then open the valve 99 against the action of spring 102 even though the roller may still be on the high part of the cam. Thus, the vacuum or vacuum resistance in the cylinder can never get beyond that for which the spring 102 is set even though there might be abnormal conditions. Therefore, the cam operation and function of the diaphragm 97 in cooperation with spring 102 is to maintain the same relative vacuum in the cylinder at given points in the movement of the cylinder in the control of the clutch engagement travel regardless of leaks or other abnormal conditions tending to change conditions in the cylinder. In other words, it automatically compensates for leaks or other outside things tending to change conditions in the cylinder chamber 35.

Although only a single embodiment of the invention has been illustrated and described, it is to be expressly understood that the same is not limited thereto but that various changes may be made in the mechanical details as well as in the design and arrangement of parts illustrated without departing from the spirit and scope of the invention as the same will now be understood by those skilled in the art. Reference will, therefore, be had primarily to the appended claims for a definition of the limits of the invention.

What is claimed is:

1. Clutch control mechanism for an automotive vehicle provided with a clutch having driving and driven elements and comprising in combination therewith, a pressure differential operated motor operably connected with the clutch, a primary control valve operative to initiate the disengaging and engaging operations of said motor, and a pressure differential operated valve, operable when the clutch elements initially contact, to automatically vary the rate of clutch engagement.

2. In an automotive vehicle provided with a clutch having driving and driven elements, power means for operating said clutch comprising a pressure differential operated motor operably connected to the driven element of the clutch, a control valve for initiating the clutch disengaging and engaging operations of said motor, and other valve means for controlling the clutch engaging operation of the motor comprising means controlled by a spring, the atmosphere and the fluid pressure of the motor and automatically operative, when the elements of the clutch initially contact, to retard the engagement of the clutch.

3. In an automotive vehicle provided with a clutch-actuating member, power means for operating said clutch-actuating member including a pneumatic motor and valve mechanism for controlling the operation of said clutch-operating motor, said valve mechanism comprising means for initiating the clutch-disengaging and engaging operations of said motor, and further comprising means operable in accordance with the degree of vacuum within one end of said motor to abruptly reduce the rate of movement of the aforementioned clutch-actuating member as the clutch is being engaged.

4. In an automotive vehicle provided with a clutch-controlling member, pressure differential operated means for operating said clutch-controlling member comprising a vacuum actuated fluid motor including a reciprocable power element operably connected to the said member, and further comprising valvular mechanism for controlling the fluid pressure within said motor, said valvular mechanism comprising manually operated means for initiating the clutch-disengaging and engaging operations of said motor, and further comprising means operable by and in accordance with the vacuum created within the motor as the clutch is being engaged to abruptly modify the rate of change of pressure differential acting on the aforementioned reciprocable power element to thereby abruptly decrease the rate of engaging movement of the clutch.

5. In an automotive vehicle provided with a clutch actuating member, power means for operating said clutch actuating member, including a motor and valve means for controlling the operation of said clutch operating motor, said valve means comprising means for initiating the clutch disengaging and engaging operations of said motor, and further comprising means operable in accordance with the degree of vacuum within one end of said motor to abruptly reduce the rate of movement of the aforementioned clutch actuating member as the clutch is being engaged.

6. In an automotive vehicle provided with a clutch, pressure differential operated means for operating said clutch comprising a fluid motor including a reciprocable power element operably connected to the clutch, and further comprising valvular means for controlling the gaseous pressure within said motor, said valvular means comprising manually operated means for initiating the clutch disengaging and engaging operations of said motor, and further comprising means operable by and in accordance with the vacuum created within the motor as the clutch is being engaged to abruptly change the rate of change of pressure differential acting on the aforementioned reciprocable power element to thereby abruptly decrease the rate of engaging movement of the clutch.

7. In an automotive vehicle provided with a clutch-actuating member, power means for operating said clutch actuating member including a pneumatic motor and valve mechanism for controlling the operation of said clutch operating motor, said valve mechanism comprising means for initiating the clutch disengaging and engaging operations of said motor, and further comprising means operable in accordance with the degree of vacuum within one end of the air chamber of said motor to abruptly reduce the rate of movement of the aforementioned clutch-actuating member as the clutch is being engaged.

8. The combination with an automotive vehicle provided with an internal combustion engine and a clutch controlling member, of vacuum-operated power means for operating said member, said power means including a vacuum actuated motor having a chamber containing a reciprocable element operatively connected with said member, a conduit interconnecting one end of said chamber with the intake manifold of said engine, valvular mechanism for controlling the flow of air to and from said chamber, said valvular mechanism comprising means for initiating the clutch disengaging and engaging operations of said motor by alternately opening and closing the connection between said manifold and said chamber, and further comprising a valve member operable to admit air from the atmosphere to the chamber interior after the aforementioned means has been operated to initiate the engagement of the clutch, together with yieldable means acting on said valve member, said valve member being subjected to a pressure-differential created by the pressure of the atmosphere acting on one side thereof and the partial vacuum in said motor chamber acting on the other side, said pressure differential acting in opposition to the force of said yieldable means, whereby, when the degree of vacuum within said chamber is decreased to a predetermined degree, said yieldable means function to permit movement of said valve member to cut off the then existing communication between the atmosphere and said chamber around said valve member.

9. In an automotive vehicle provided with an internal combustion engine and a clutch, vacuum operated power means for operating said clutch, said power means including a motor having a reciprocable element operatively connected with the clutch, a fluid transmitting connection interconnecting one end of said motor with the intake manifold of said engine, and valvular means for controlling the mode of flow of air to and from said motor, said valvular means comprising means for initiating the clutch disengaging and engaging operations of said motor by alternately opening and closing the connection between the manifold and motor, said valvular means further comprising a reciprocable valve member operable to admit atmosphere to the motor after the aforementioned means is operated to initiate the engagement of the clutch, yieldable means acting on said latter member, said reciprocable valve member being subjected to a pressure differential created by the effect of the atmosphere acting on one side of said member and the vacuum of said motor acting on the other side of said member, said differential acting in opposition to the force of said yieldable means whereby when the degree of vacuum within said motor is decreased to a predetermined factor said yieldable means functions to move said reciprocable valve member to cut off the then existing communication between the atmosphere and motor via said reciprocable valve member.

10. In an automotive vehicle comprising an internal-combustion engine and a clutch, means for operating the clutch comprising a pressure differential operated motor, a control valve for said motor, and pressure differential operated means controlling the clutch engaging operation of said motor.

11. In an automotive vehicle comprising an internal-combustion engine and a clutch, means for operating the clutch comprising a pressure differential operated motor, valvular means cooperating with said motor to control the clutch engaging operation thereof and provide a variable engaging movement of the clutch, and pressure differential operated means supplementing said aforementioned valvular means for controlling the clutch engaging operation of said motor.

12. In clutch operating mechanism for automobiles, a source of vacuum, a vacuum cylinder and piston mechanism provided with means for vacuum connection and for air relief, and means for controlling the air relief associated with said cylinder and piston mechanism to afford relatively unrestricted relief during the first part of the stroke of the piston followed by relatively restricted relief, said controlling means including a diaphragm valve and resilient means for biasing the valve, said diaphragm being subjected to differential pressure.

13. In apparatus of the class described, a fluid pressure power device including means responsive to differential pressure connected to the operating member of a motor vehicle clutch having a normal bias to operative or engaged position, and control means for said power device, including valve means for controlling communication between said device and a source of fluid pressure, and differential pressure operated means independent of said valve means.

14. In apparatus of the class described, a fluid pressure power device including means responsive to differential pressure connected to the operating member of a motor vehicle clutch having a normal bias to engaged position, and means for controlling said power device to effect an engaging contact of the driving surfaces of said clutch, said last named means including differential pressure operated means adapted to control the clutch engaging movement of said first-mentioned means after the initiation of said movement.

15. Apparatus of the character described, comprising a fluid pressure power device including a pair of relatively movable members, means for creating a differential of forces acting on one of said members to move the same, and means including fluid pressure operated means for controlling the rate of movement of said last-named member.

16. In an automotive vehicle provided with an internal-combustion engine having an intake manifold and further provided with a clutch, vacuum operated clutch operating means connected to said clutch, said means comprising a fluid motor, a fluid transmitting connection between said motor and manifold, a control valve for said connection, means for operating said valve, and pressure differential operated means for controlling the clutch engaging operation of the motor.

CHARLES A. BREWER.